(12) United States Patent
Itou

(10) Patent No.: US 6,982,330 B2
(45) Date of Patent: Jan. 3, 2006

(54) CARBAZOLE BASED COMPOUND, COLORING MATERIAL, COLORED HIGH MOLECULAR ORGANIC MATERIAL AND ELECTROLUMINESCENT MATERIAL

(75) Inventor: Kiyoshi Itou, Tokyo (JP)

(73) Assignee: Dai Nippon Printing Co., LTD, Tokyo-To (JP)

( * ) Notice: Subject to any disclaimer, the term of this patent is extended or adjusted under 35 U.S.C. 154(b) by 399 days.

(21) Appl. No.: 10/395,528

(22) Filed: Mar. 24, 2003

(65) Prior Publication Data
US 2003/0214228 A1 Nov. 20, 2003

(30) Foreign Application Priority Data
Mar. 25, 2002 (JP) .............................. 2002-084570

(51) Int. Cl.
C07D 251/54 (2006.01)
C08K 5/34 (2006.01)
H01J 63/04 (2006.01)

(52) U.S. Cl. .................... 544/198; 524/89; 313/504
(58) Field of Classification Search ................ 544/198; 524/89; 313/504
See application file for complete search history.

(56) References Cited
FOREIGN PATENT DOCUMENTS
JP 02-285357 * 11/1990
JP 2003-335753 * 11/2003

* cited by examiner

Primary Examiner—Fiona T. Powers
(74) Attorney, Agent, or Firm—Timothy J Keefer; Seyfarth Shaw LLP

(57) ABSTRACT

The present invention provides a new carbazole based compound represented by the following formula (1):

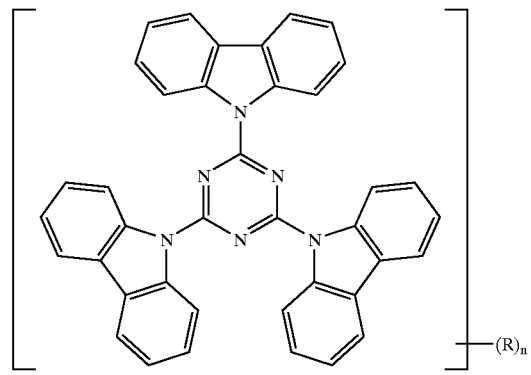

wherein R is a substituent selected among a hydrogen atom, an alkyl group, an alkyl ether group, a sulfoamino group, a carbon cyclic group, a heterocyclic group and an aromatic cyclic group, "n" is integer, where at least one substituent other than the hydrogen atom are introduced and the each substituent may be the same or different.

4 Claims, 2 Drawing Sheets

CARBAZOLE BASED COMPOUND, COLORING MATERIAL, COLORED HIGH MOLECULAR ORGANIC MATERIAL AND ELECTROLUMINESCENT MATERIAL

BACKGROUND OF THE INVENTION

1. Field of the Invention

The present invention relates to a novel carbazole based compound, which is usable as coloring materials emitting fluorescent light. These coloring materials are useful as high molecular organic materials incorporating with high molecular organic compounds, and also useful as electroluminescent materials.

2. Description of the Related Art

Carbazoles represented by the following formula (2) and fluorenes represented by the following formula (3) have been known as compounds exhibiting fluorescence and having heat resistance. Such a compound has strong crystallinity because it forms a hydrogen bond attributable to its three-dimensional structure, so that when a colored layer or film is formed using the above compound (2) or (3) as a coloring material, it is crystallized, giving rise to the problem that it is hard to form an amorphous layer important for the formation of an organic electroluminescent light emitting layer or the like.

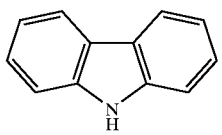

Formula (2)

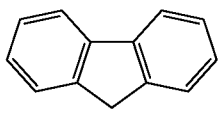

Formula (3)

SUMMARY OF THE INVENTION

In view of this circumstances, it is an object of the present invention to provide a new carbazole type fluorescent light emitting coloring material which is decreased in stereoregularity as well as retaining a good fluorescent light emitting characteristics and heat resistance to the extent of a conventional carbazole type dye, having solubility to an organic solvent in addition, and thus being usable for a light emitting layer of an organic electroluminescence element (organic EL element).

A novel carbazole based compound according to the present invention for solving the foregoing problem is a carbazole based compound represented by the following formula (1), which is dissoluble in an organic solvent.

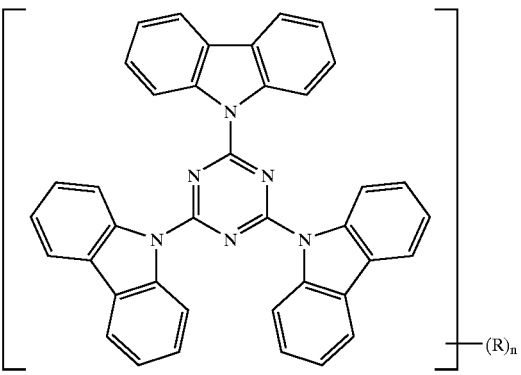

Formula (1)

wherein R is a substituent selected among a hydrogen atom, an alkyl group, an alkyl ether group, a sulfoamino group, a carbon cyclic group, a heterocyclic group and an aromatic cyclic group, "n" is integer denoting number of introduced substituents, where at least one substituent other than the hydrogen atom are introduced and the each substituent may be the same or different.

DETAILED DESCRIPTION OF THE PREFERRED EMBODIMENT

Figure 1:
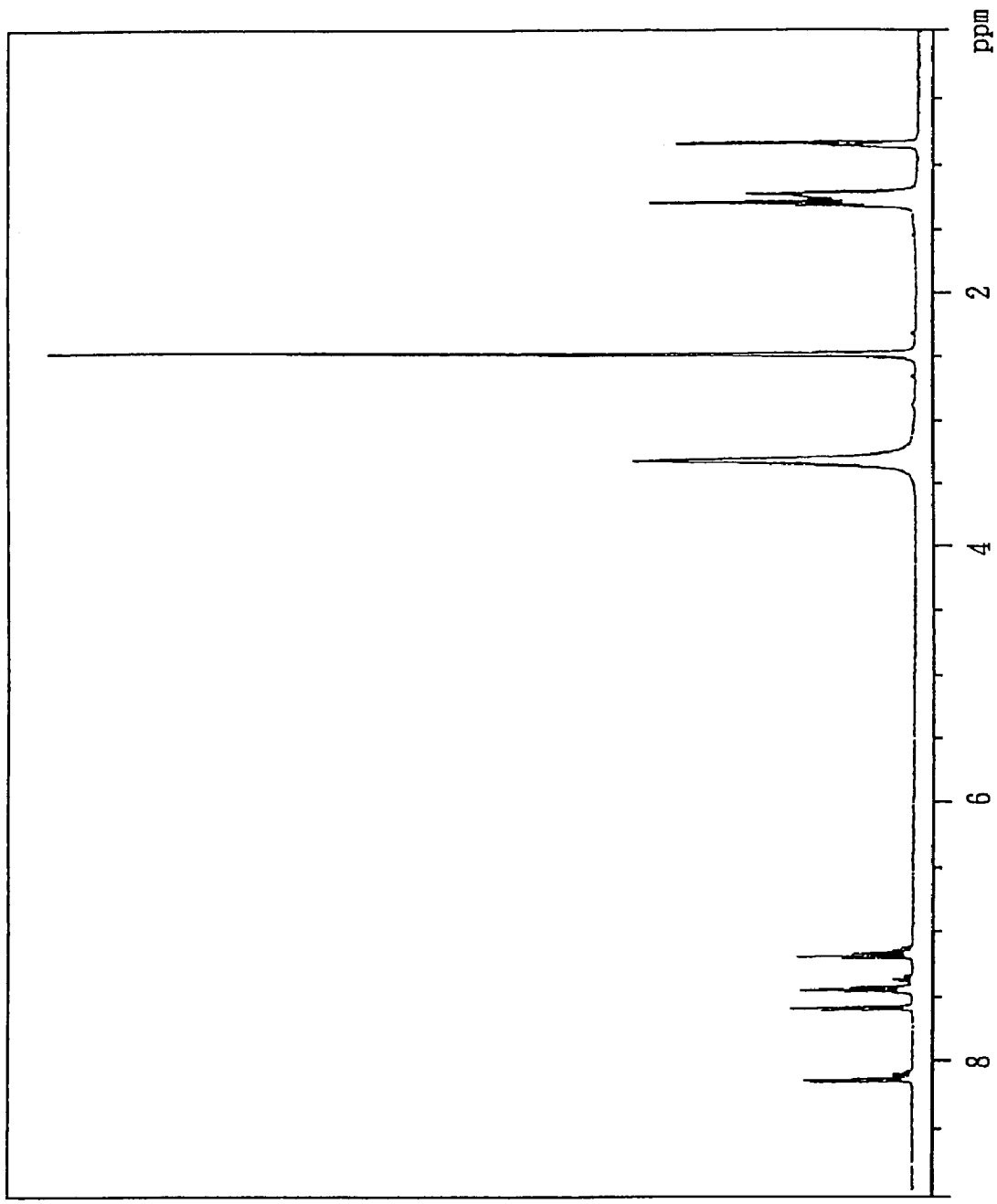
FIG. 1 is a view showing the $^1$H-NMR spectrum of a compound obtained in an Example; and, FIG. 2 is a view showing the fluorescent emission spectrum of a novel carbazole based compound.

A carbazole based compound according to the present invention takes a structure in which three carbazole groups are connected by a triazine group. The carbazole based compound of the present invention is provided with fluorescent light emitting characteristics and heat resistance due to the carbazole part, decreased in stereoregularity of the carbazole itself due to the connecting part and provided with solubility in a solvent by the provision of a side chain part formed on the carbazole ring.

The carbazole based compound represented by the formula (1) may be used as a coloring material such as dyes because it exhibits a yellow color and has solubility in an organic solvent. Among the carbazole based compounds represented by the formula (1), only one compound or a mixture of two or more kinds of compounds may be used as a coloring material. In the case of using a mixture of the carbazole based compounds represented by the formula (1), this has the advantage that solubility in a solvent is more improved.

The carbazole based compound represented by the formula (1) can be utilized as a colored high molecular organic material by compounding it in a high molecular organic material. For example, the carbazole based compound may be utilized as plastic materials, melt products, spinning solutions, various coating materials including a solution form, various inks such as screen printing inks, ink jet printing inks or inks for non-impact printing such as thermosensible transfer printing, toners or pigments in blended products.

The carbazole based compounds represented by the formula (1) emit blue fluorescent light and are therefore useful for the light emitting layer of an organic EL element.

In the R in the formula (1), the alkyl group is preferably from one to twenty carbon atoms (C1 to C20) and particularly C6 to C20 straight- or branched- chain alkyl groups and specific examples of the alkyl group include a hexyl, heptyl and octyl. The alkyl ether group is preferably an ethylene glycol group and propylene glycol group and specific examples of the alkyl ether group include a diethylene glycol monomethyl ether group, triethylene glycol monomethyl ether group and propylene glycol monomethyl ether group. The sulfoamino group is preferably sulfoaminoalkyl groups containing a C1 to C20 and particularly C6 to C20 straight- or branched-chain alkyl groups and specific examples of the sulfoamino group include a sulfoaminoethyl group, sulfoamino-t-butyl group and sulfoaminohexyl group. The carbon cyclic group is preferably aliphatic carbon cyclic functional groups having 5 to 8 carbon atoms as ring structure elements and particularly a C6(cyclohexyl group) is preferable. The heterocyclic group is preferably a five- to eight-membered cyclic aliphatic functional group and particularly has a piperazine structure or a dioxane structure. The aromatic cyclic group is preferably aromatic carbon rings such as a benzene ring and naphthalene ring and heteroaromatic substituents such as a pyridine ring and triazine ring and particularly preferable are benzene ring and naphthalene ring which are easily synthesized.

As described above, the novel carbazole based compound of the present invention exhibits a yellow color and has solubility in an organic solvent. Therefore, it may be used as a coloring material such as dyes. The novel carbazole based compound of the present invention emits blue fluorescent light and is therefore useful for the light emitting layer of an organic EL element.

The substituent "R" on the carbazole ring is required to be simple in its chemical structure and small in its substituted number "n" for the thermal stability (and the electrical stability in a case applying to the organic EL element), but the substituent is also required to have a certain extent of bulkiness and number for solubility (suppressing ability to crystallization) of the carbazole based compound.

For the chemical structure of the substituent "R", preferable examples include a short chain alkyl group such as methyl and ethyl, which have about 1–6 carbon atoms, and preferably 1–3 carbon atoms. A preferable substituted number "n" is 10 or less.

In particular, when the toluene is used to dissolve the carbazole based compound having ethyl group(s) as the substituent "R", a preferable substituted number "n" is in a range of about 3 to 6.

The carbazole based compound of the above formula (1) has a high solubility in solvents. For example, it is possible to dissolve the carbazole based compound of the above formula (1) in the toluene or xylene at 50° C. at 1% by weight or more, preferably 1.5% by weight or more, and more preferably 2% by weight or more. A concentration at 2% by weight is an objective point for a light emitting or luminescent material to be used for preparing an ink, and if the material can satisfy this requirement, it has an excellent solubility among materials of this kind.

Further, carbazole based compound of the above formula (1) is hard to be crystallized in coating and drying process, and thus being good in a film formation ability.

For example, the carbazole based compound can suppress a crystallization of the coated layer to the extent that occurrence of the crystallization can not be found when a solution of the carbazole based compound in the toluene or xylene which contains the carbazole based compound at 1% by weight, preferably 1.5% by weight, and more preferably 2% by weight is applied on a glass plate or substrate, dried it and visually observed, or when a solution of the carbazole based compound and an acrylic binder resin in the toluene or xylene which contains the carbazole based compound and the acrylic binder resin at 1% by weight respectively, preferably 1.5% by weight respectively, and more preferably 2% by weight respectively is applied on a glass plate or substrate, dried it and visually observed.

EXAMPLES

The present invention will be hereinafter explained by way of examples.

Example 1

<Synthesis of a Compound Represented by the Formula (4)>

0.05 g of carbazole manufactured by Sigma-Aldrich was added to dehydrated tetrahydrofuran and the mixture was stirred at ambient temperature for 30 minutes in the presence of sodium hydride. Thereafter, 0.14 g of cyanuric acid chloride manufactured by Aldrich which was dissolved in a small amount of tetrahydrofuran was gradually added to the mixture. After the addition of the whole was finished, the mixture was stirred at ambient temperature for 3 hours and then the resulting mixture was heated under reflux at 80° C. for 5 hours.

After the reaction was finished, sodium hydride was inactivated using an aqueous solution of ammonium chloride. Then, precipitates which were dissolved in neither water nor an organic solvent were separated by filtration and dried to obtain 0.38 g of a white solid.

Further, this powder was stirred in chloroform for 12 hours in the presence of chlorosulfonic acid manufactured by Wako Pure Chemical Industries, Ltd. 1.00 g of n-hexylamine manufactured by Tokyo Kasei which was dissolved in a small amount of tetrahydrofuran was gradually added to the mixture under ice-cooling, which was stirred at ambient temperature for 24 hours as it was. As a result, it was confirmed that a part of the powder was dissolved in chloroform to exhibit a yellow color.

When the component dissolved in chloroform were concentrated, 0.22 g of a pale yellow solid was obtained. When the melting point of the solid was measured, the solid had no clear melting point and was decomposed gradually at 140 to 145° C. The solution $^1$H-NMR (measured in dimethylsulfoxide deuteride) was measured. The results are shown in FIG. 1 as a $^1$H-NMR spectrum. From the $^1$H-NMR spectrum of FIG. 1, the powder was determined as the carbazole based compound represented by the formula (4).

Formula (4)

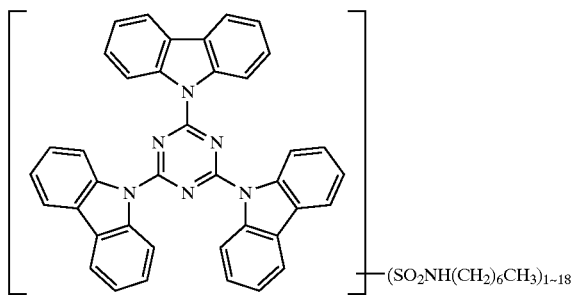

Figure 2:
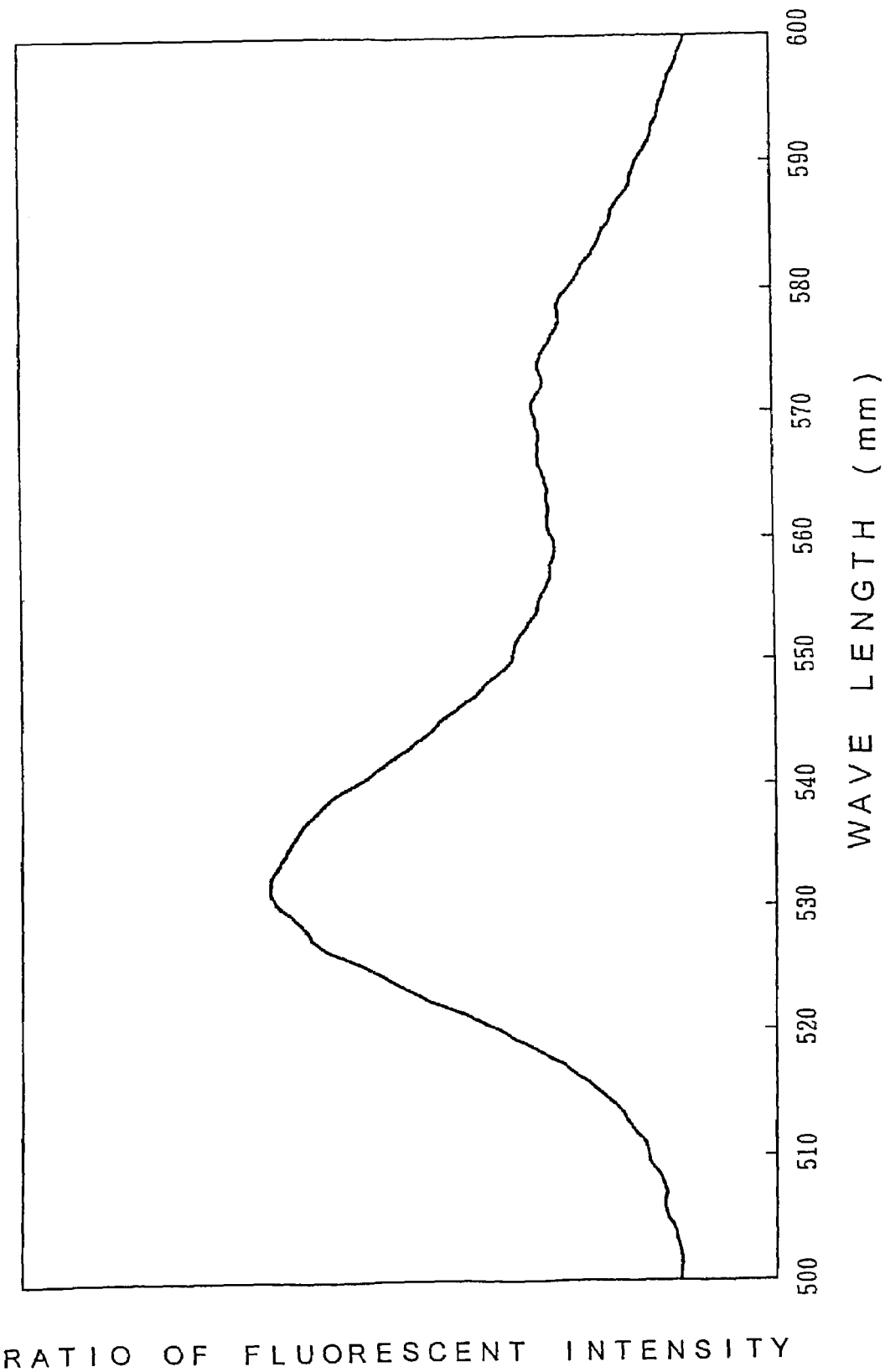

The fluorescent emission spectrum of the resulting carbazole based compound was measured. As a result, the carbazole based compound exhibited good blue fluorescent light emission. FIG. 2 shows the fluorescent emission spectrum.

Example 2

<Solubility to Solvent>

The carbazole based compound of the formula (4) synthesized in Example 1 was added in the toluene or xylene so as to make concentration at 2% by weight, and then stirred in a thermal condition at 50° C. for one hour. As a result, the carbazole based compound was completely dissolved.

On the other hand, though the perylene (available from Tokyo Kasei Co.,) which is a conventional compound having a blue fluorescent emission similar to that emitted by the compound of the formula (4) was applied to the same solubility test, solubility was insufficient and remain of insoluble portion was observed.

Example 2

<Suppressibility of Crystallization (Film Formation Ability)>

A toluene solution containing 2% by weight of the carbazole based compound of the formula (4) synthesized in Example 1 was prepared. Also, the other toluene solution containing 2% by weight of the same carbazole based compound and 2% by weight of an acrylic binder resin was prepared.

For the comparative examples, the other toluene solution containing 2% by weight of the carbazole (available from Sigma Aldrich Co,.) and the still other toluene solution containing 2% by weight of the carbazole and 2% by weight of the acrylic binder resin were prepared.

2 ml of the each toluene solution was dropped on a non-alkaline glass plate with 5 cm-square shape, and carried out a spin coating at 1,000 rotation per minute for about 2 seconds. Thereafter, it was dried at ambient temperature for 30 minutes, and then a surface of the coating layer was observed and evaluation was carried out regarding suitabllity of coating and film-formation process and suppressibility of crystallizing.

As a result, the coating layers formed from the solution of the carbazole based compound of the formula (4) and the mixture solution of the same carbazole based compound and the acrylic binder resin were homogeneous and showed no crystallization.

On the other hand, the coating layers formed from the solution of the carbazole and the mixture solution of the carbazole and the acrylic binder resin were crystallized to an extent that findable by visual observation, and thus being inferior in film formation ability.

What is claimed is:

1. A carbazole based compound represented by the following formula (1):

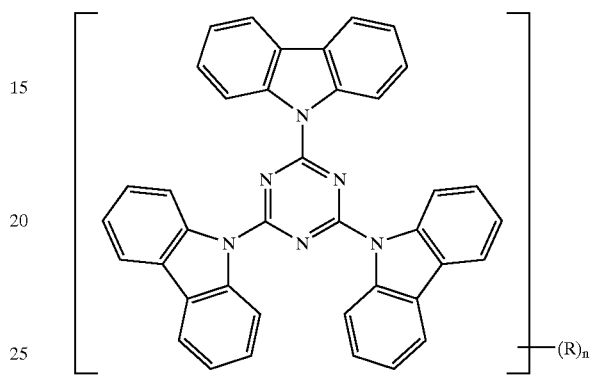

wherein R is a substituent selected from the group consisting of a hydrogen atom, an alkyl group, an alkyl ether group, a sulfoamino group, a carbon cyclic group, a heterocyclic group and an aromatic cyclic group, "n" is integer, where at least one substituent other than the hydrogen atom are introduced and each substituent may be the same or different.

2. A coloring material comprising a carbazole based compound wherein the carbazole based compound is represented by the following formula (1):

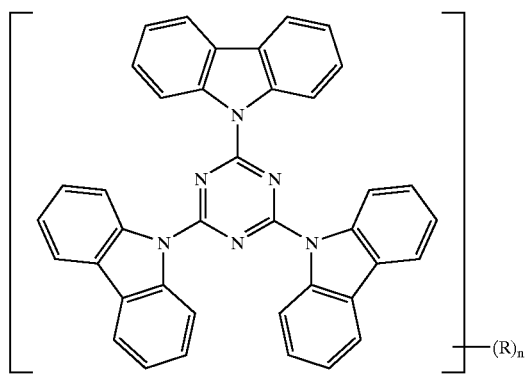

wherein R is a substituent selected from the group consisting of a hydrogen atom, an alkyl group, an alkyl ether group, a sulfoamino group, a carbon cyclic group, a heterocyclic group and an aromatic cyclic group, "n" is integer, where at least one substituent other than the hydrogen atom are introduced and each substituent may be the same or different.

3. A colored high molecular organic material comprising a coloring material comprising a carbazole based compound and a high molecular organic compound wherein the carbazole based compound is represented by the following formula (1):

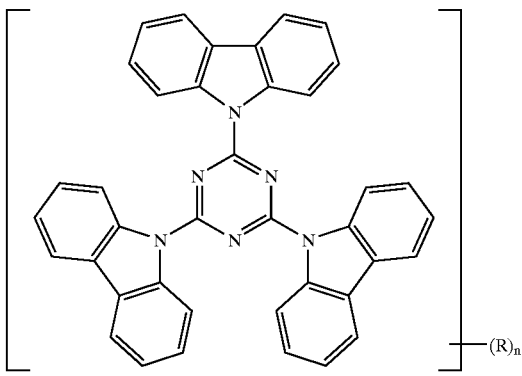

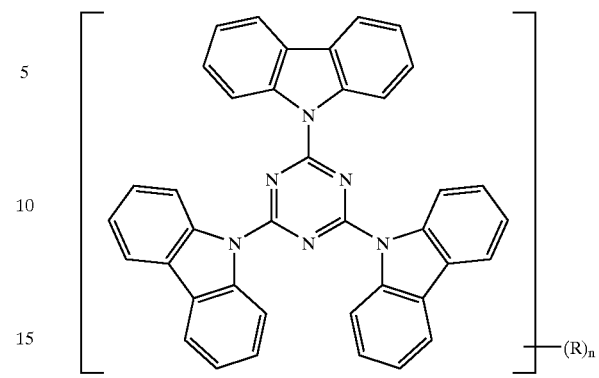

wherein R is a substituent selected from the group consisting of a hydrogen atom, an alkyl group, an alkyl ether group, a sulfoamino group, a carbon cyclic group, a heterocyclic group and an aromatic cyclic group, "n" is integer, where at least one substituent other than the hydrogen atom are introduced and each substituent may be the same or different.

4. An electroluminescent material comprising a coloring material comprising a carbazole based compound wherein the carbazole based compound is represented by the following formula (1):

wherein R is a substituent selected from the group consisting of a hydrogen atom, an alkyl group, an alkyl ether group, a sulfoamino group, a carbon cyclic group, a heterocyclic group and an aromatic cyclic group, "n" is integer, where at least one substituent other than the hydrogen atom are introduced and each substituent may be the same or different.

* * * * *